United States Patent
Ragupathi et al.

(10) Patent No.: US 9,791,902 B2
(45) Date of Patent: Oct. 17, 2017

(54) SYSTEM AND METHOD FOR PROVIDING MULTI-DIMENSIONAL POWER SUPPLY EFFICIENCY PROFILES

(71) Applicant: Dell Products, LP, Round Rock, TX (US)

(72) Inventors: Dinesh K. Ragupathi, Round Rock, TX (US); Ashish Munjal, Round Rock, TX (US); Thomas F. Archer, Austin, TX (US); Binay A. Kuruvila, Cedar Park, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 30 days.

(21) Appl. No.: 14/716,332

(22) Filed: May 19, 2015

(65) Prior Publication Data

US 2016/0342186 A1    Nov. 24, 2016

(51) Int. Cl.
| | |
|---|---|
| G06F 1/00 | (2006.01) |
| G06F 1/32 | (2006.01) |
| G06F 1/26 | (2006.01) |
| G06F 1/18 | (2006.01) |
| G06F 1/28 | (2006.01) |

(52) U.S. Cl.
CPC ............... *G06F 1/189* (2013.01); *G06F 1/26* (2013.01); *G06F 1/28* (2013.01); *G06F 1/32* (2013.01)

(58) Field of Classification Search
CPC ..................................... G06F 1/32; G06F 1/26
See application file for complete search history.

(56) References Cited

U.S. PATENT DOCUMENTS

| | | |
|---|---|---|
| 5,579,524 A | 11/1996 | Kikinis |
| 6,166,934 A | 12/2000 | Kajouke et al. |
| 7,535,122 B2 | 5/2009 | Visairo-Cruz et al. |
| 7,720,637 B2 | 5/2010 | Brundridge |
| 7,831,843 B2 | 11/2010 | Brundridge et al. |
| 8,132,034 B2 | 3/2012 | Lambert et al. |
| 8,499,178 B2 | 7/2013 | Lambert et al. |
| 8,566,427 B2 | 10/2013 | Radhakrishnan et al. |
| 8,726,269 B2 | 5/2014 | Chaganti |
| 8,918,656 B2 | 12/2014 | Munjal et al. |
| 9,413,220 B2* | 8/2016 | Tan .................... H02M 1/08 |
| 2004/0027099 A1 | 2/2004 | Fujii |
| 2004/0165407 A1 | 8/2004 | Umeda et al. |
| 2004/0215990 A1 | 10/2004 | Allen et al. |
| 2007/0079364 A1 | 4/2007 | Abels et al. |
| 2007/0083861 A1 | 4/2007 | Becker et al. |
| 2008/0284510 A1* | 11/2008 | Drogi .................. H03F 1/0222 |
| | | 330/136 |
| 2009/0089604 A1* | 4/2009 | Malik .................. G06F 1/28 |
| | | 713/340 |

(Continued)

FOREIGN PATENT DOCUMENTS

WO    WO 2009/007459 A3    1/2009

*Primary Examiner* — Phil Nguyen
(74) *Attorney, Agent, or Firm* — Larson Newman, LLP (57) ABSTRACT

A first operating condition and a second operating condition at a power supply unit (PSU) are determined at a first time. A power conversion efficiency of the PSU is determined at the first time. A first entry at a power conversion efficiency profile is generated, the first entry associating the first power conversion efficiency with the first operating condition and the second operating condition.

20 Claims, 8 Drawing Sheets

(56) References Cited

U.S. PATENT DOCUMENTS

| | | | |
|---|---|---|---|
| 2009/0296432 A1* | 12/2009 | Chapuis | H02J 1/08 363/65 |
| 2010/0037078 A1 | 2/2010 | Gross et al. | |
| 2010/0058092 A1* | 3/2010 | Bougaev | G06F 1/28 713/340 |
| 2010/0064170 A1* | 3/2010 | Gross | G06F 1/3203 714/14 |
| 2010/0100756 A1 | 4/2010 | Rahardjo | |
| 2010/0107159 A1 | 4/2010 | Radhakrishnan et al. | |
| 2010/0146039 A1 | 6/2010 | Lo et al. | |
| 2010/0277000 A1 | 11/2010 | Humphrey et al. | |
| 2010/0319153 A1 | 12/2010 | Chen | |
| 2010/0332873 A1* | 12/2010 | Munjal | G06F 1/3203 713/320 |
| 2011/0115447 A1* | 5/2011 | Lin | H02M 3/1584 323/234 |
| 2012/0066519 A1* | 3/2012 | El-Essawy | H05K 7/1492 713/300 |
| 2012/0281433 A1* | 11/2012 | Yamanaka | H02M 7/003 363/13 |
| 2013/0027009 A1* | 1/2013 | Tang | H02M 3/1584 323/271 |
| 2013/0093251 A1* | 4/2013 | Kondo | H02M 3/1584 307/82 |
| 2014/0181544 A1 | 6/2014 | Breen et al. | |

* cited by examiner

SYSTEM AND METHOD FOR PROVIDING MULTI-DIMENSIONAL POWER SUPPLY EFFICIENCY PROFILES

FIELD OF THE DISCLOSURE

This disclosure relates generally to information handling systems, and more particularly relates to providing multi-dimensional power supply efficiency profiles.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, networking systems, and power supplies.

BRIEF DESCRIPTION OF THE DRAWINGS

Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings certainly can be utilized in this application.

FIGS. 1-8 illustrate techniques for compiling multi-dimensional power conversion efficiency profiles for power supply units (PSUs) at an information handling system. A multi-dimensional power conversion efficiency profile provides a mapping between power conversion efficiency of a PSU and two or more operating parameters. For example, PSU efficiency can be affected by a combination of PSU utilization and PSU temperature, or another combination of operating or environmental parameters. The compiled multi-dimensional power conversion efficiency profile can be stored and utilized to dynamically regulate engagement of PSUs, and thereby improve power conversion efficiency at the information handling system.

Figure 1:
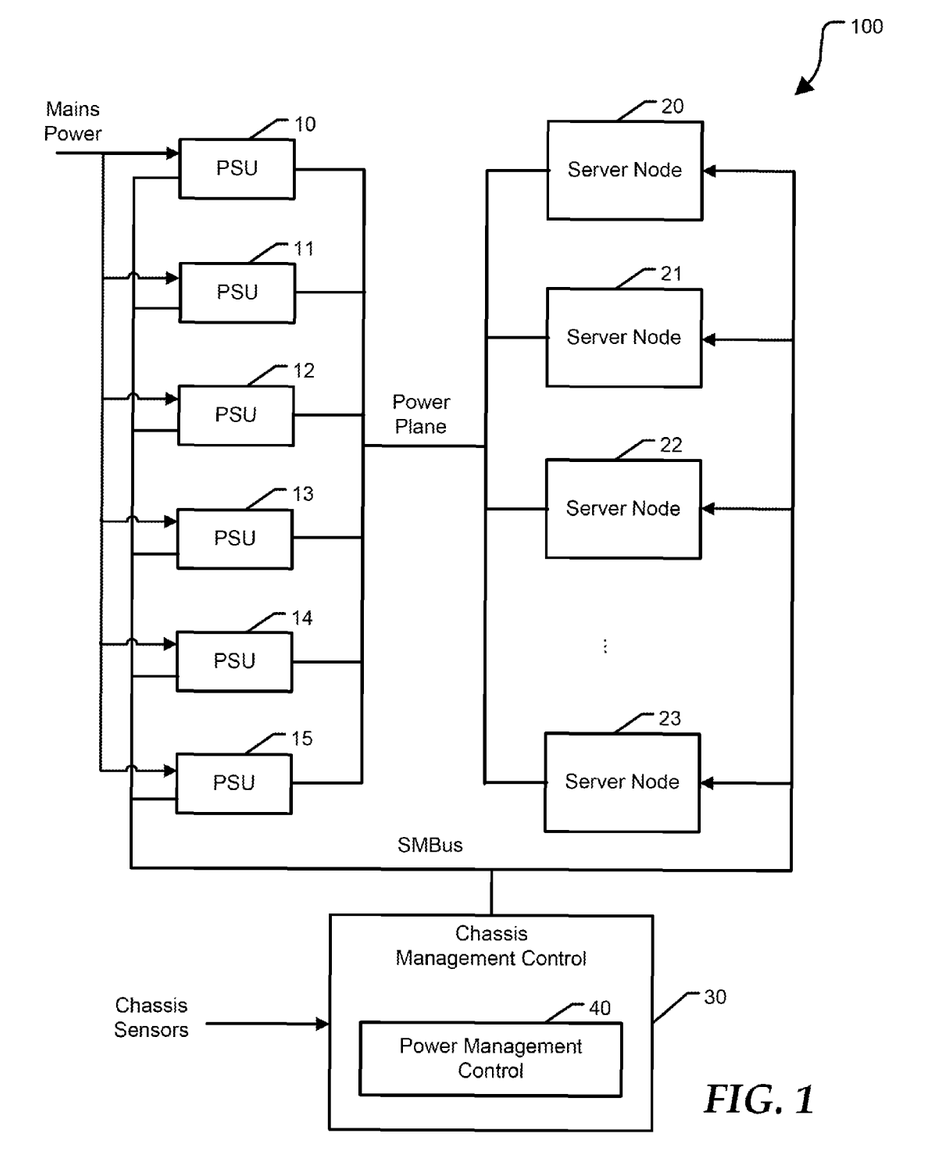
FIG. 1 is a block diagram illustrating an information handling system having a power management control module to control a plurality of power supply units (PSUs) in accordance with a specific embodiment of the present disclosure.

FIG. 1 shows an information handling system 100 in accordance with at least one embodiment of the present disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

For the purpose of illustration, information handling system 100 is described in an example context of a server chassis with multiple server blades. The techniques described herein can be applied in other information handling system contexts that utilize one or multiple power supply units (PSUs) without departing from the scope of the present disclosure.

Information handling system 100 includes a plurality of power supply units (PSUs), such as PSUs 10, 11, 12, 13, 14, and 15, server nodes 20, 21, 22, and 23, and a chassis management control module 30. CMC 30 is configured to monitor and control components of information handling system 100. For example, chassis management control module can activate and deactivate server nodes in response to a power conservation policy, computational requirements, and the like. CMC 30 includes a power management control module 40, which is configured to control operation of PSUs 10-15, and selectively engage and disengage PSUs based on current operating characteristics of information handling system 100 and in accordance with efficiency profiles associated with PSUs 10-15, described in greater detail below. CMC 30 includes an input for receiving information from sensors included at a system 100 chassis. Power management controller 40 is configured to monitor and engage operation of PSUs 10-15. A PSU is engaged when it is actively providing power to a load, such as information handling system 100. Conversely, a PSU is disengaged when it is not providing power to a load of the information handling system, such as in response to a failure of the PSU, or in response to an action by chassis management control module 30. Information handling system 100 may include other components in addition to those illustrated that also receive power from power delivery module 10.

Each PSU of PSUs 10-15 has an input to receive electric power via a node labeled "MAINS POWER," a bidirectional control interface terminal connected to a node labeled "SMBus," and an output connected to a node labeled "POWER PLANE." Each server node of server nodes 20-23 has an input to receive power from node POWER PLANE and a bidirectional control interface terminal connected to node SMBus. Chassis management control module 30 is connected to node SMBus. Node SMBus facilitates communication of information between components of information handling system 100 in accordance with an industry-standard SMBus serial interface protocol. For the purpose of example, six PSUs are illustrated at FIG. 1, however a greater or fewer number of PSUs can be included at information handling system 100.

In one embodiment, each PSU of PSUs 10-15 is compliant with a standard power-management protocol known as PMBus. The PMBus protocol is implemented over the SMBus protocol, and enables chassis management control module 30 to program, control, and conduct real-time monitoring of each PSU of PSUs 10-15. For example, power management control module 40 is configured to query each PSU of PSUs 10-15 to determine an amount of mains power received at the input of a selected PSU via node MAINS POWER (power input), and to determine an amount of power provided to node POWER PLANE at the output of the selected PSU (power output). Based on this information, power management control module 40 can determine a power conversion efficiency of each PSU. Module 40 can also determine how much power each PSU is providing in relation to the rated power delivery capability of the PSU, referred to herein as PSU utilization. In addition, module 40 can determine one or more operating parameters, such as a PSU device temperature, PSU cooling-fan exhaust temperature, ambient air temperature, and the like. While the PMBus protocol is used in this example, another standard or proprietary protocol can be used to implement communication between power management control module 40 and each PSU of PSUs 10-15.

Each server node of server nodes 20-23 can include one or more data processing devices, such as a microprocessor or microcomputer, and each data processing device can include one or more processor cores. Each server node of server nodes 20-23 is operable to access computer-readable medium such as a memory device, which is capable of storing a software program that includes a set of instructions to manipulate at least one processor to perform desired tasks. A server node further can include memory devices, other information storage devices, peripheral interface devices, and the like. Furthermore, a server node can include one or more interfaces (not shown) to support communications and information transfer with another server node, or with other components of information handling system 100 such as shared information storage devices, peripheral interface devices, and the like (not shown at FIG. 1). The SMBus interface is an example of one such interface. In an embodiment, information handling system 100 may include a server rack, and server nodes 20-23 may each represent blade servers.

The amount of power consumed by a respective server node can vary in response to how the corresponding server node is configured, the selection and utilization of associated hardware components, and the type of computations being performed at the server node, amongst other factors. For example, chassis management control module 30 can place one or more server nodes into a power-conservation mode when demand for computational resources does not require the operation of all server nodes. In an embodiment, power management control module 40 can respond to current power demand of information handling system 100 and dynamically shift a peak operating efficiency of selected PSUs, or engage a selected number of PSUs based on information included at PSU efficiency profiles to improve the power conversion efficiency of power delivery module 10 in accordance with one or more embodiments of the present disclosure.

Figure 2:
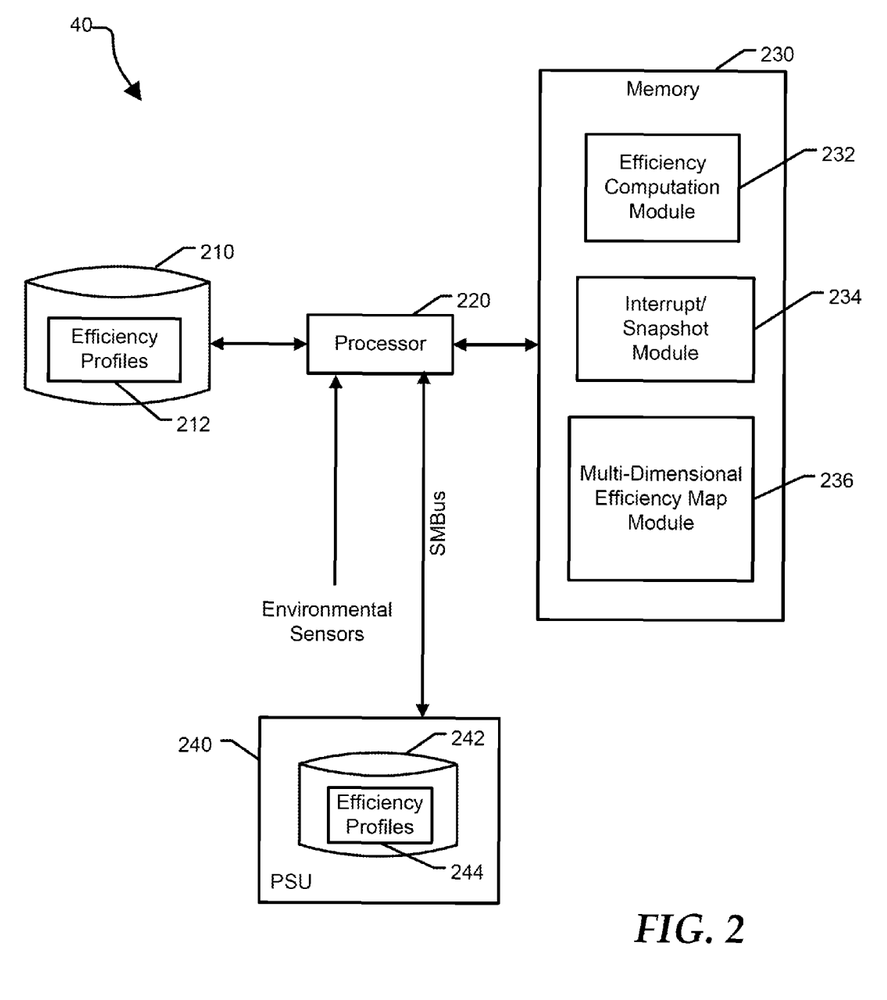
FIG. 2 is a block diagram illustrating the power management control module of FIG. 1 in accordance with a specific embodiment of the present disclosure.

FIG. 2 is a block diagram illustrating power management control module 40 of FIG. 1 in accordance with a specific embodiment of the present disclosure. Power management control module 40 can be implemented using dedicated logic devices, by one or more processors configured to execute a software program, or a combination thereof. In the illustrated example at FIG. 2, power management control module 40 is implemented as one or more processors that execute instructions included in one or more software programs. In particular, power management control module 40 includes a storage component 210, one or more processors 220 or other data processing devices, and a memory device 230. Storage component 210 is configured to store a power conversion efficiency profile 212 in a data structure such as a file, a table, a linked list, or the like. Memory device 230 is configured to store software program and associated process data to implement an efficiency computation software module 232, interrupt/snapshot module 234, and multi-dimensional efficiency map module 236.

Processor 220 includes a bidirectional control interface connected to node SMBus that is coupled to one or more PSUs 240, a bidirectional data interface connected to storage component 210, and a bidirectional data interface connected to memory device 230. Processor 220 is operable to execute software program 232, 234, and 236. In an embodiment, processor 220 includes an input to receive information from environmental sensors, such a temperature sensors associated with PSUs 10-15. Processor 220 may be a device that is dedicated to performing only tasks associated with power management control module 40, or it may perform additional processing tasks of information handling system 100. PSU 240 includes a data storage device 242 for storing an efficiency profile 244. In one embodiment, efficiency profile 244 can provide a three dimensional characterization of operating efficiency of PSU 240.

Storage component 210 can include one or more registers included at data processing device 220, a non-volatile or volatile memory device, or another device operable to store one or more power conversion efficiency profiles, such as power conversion efficiency profile 212. Memory device 230 may include one or more of a hard-disk drive, a random access memory (RAM), a read only memory (ROM), another type of data memory device, or a combination thereof. Furthermore, storage component 210 can be implemented using storage resources provided by memory device 230.

Power management control module 40 is configured to determine a respective power conversion efficiency profile representing power conversion efficiency characteristics of each corresponding PSU of PSUs 10-15 over a range of operating loads and conditions. During operation of information handling system 100, power management control module 40 can periodically request information from each PSU using the PMBus protocol conducted by node SMBus. For example, management control module 40 can issue a request to PSU 11 inquiring as to an amount of power currently being received by PSU 11, and a corresponding output power currently being provided by PSU 11. Based on this information, management control module 40 can calculate a power conversion efficiency of PSU 11 for the current operating load using the equation:

$$\text{Efficiency} = \frac{(Pin - Pout)}{Pin} \times 100 \quad \text{Eq. 1}$$

where the variable Pin represents the power consumed by the PSU (power input), and the variable Pout represents the power provided at the output of the PSU (power output). Power management control module 40 can issue similar requests to each PSU of PSUs 10-15 and do so over a range of operating conditions (and an associated range of loads) to compile a power conversion efficiency profile corresponding to each PSU as described in greater detail below.

In one embodiment, a power conversion efficiency profile of a PSU includes a set of data-pairs representative of the power conversion efficiencies of the PSU over a range of output loads or power outputs. In particular, the power conversion efficiency is calculated and expressed based on a quantity referred to as percent-of-load (POL). Percent-of-load is a fraction, expressed as a percentage, quantifying the power provided by a PSU in relation to a maximum output power capability of the PSU:

$$\text{Percent-of-load} = \frac{P_{out}}{P_{max}} \times 100 \quad \text{Eq. 2}$$

where the variable Pout represents the power provided at the output of the PSU (power output), and $P_{max}$ represents the specified maximum output power that the PSU is capable of providing. For example, if the maximum output power of a PSU is 1000 watts, and the PSU is currently providing 400 watts of power, the percent-of-load is 40%. Thus, the power conversion efficiency profile of a PSU can include a respective power conversion efficiency corresponding to percent-of-load values ranging from approximately zero to 100% of percent-of-load. The efficiency profile information can be stored in a data structure at storage component 210.

In one embodiment, PSU efficiency, POL utilization, and PSU temperature measurements can be performed periodically, for example based on a timer. The three parameters, efficiency, POL, and temperature provide an individual data point in a three-dimensional efficiency profile. A collection of data points corresponding to a range of POL and temperature values can be collected to generate a mapping of PSU efficiency. The efficiency profile can be used to estimate PSU efficiency based on a particular POL value and PSU temperature.

In another embodiment, PSU efficiency, POL utilization, and PSU temperature measurements can be performed in response to detecting a change in one or more operational or environmental parameters. For example, power management control module 40 can monitor POL utilization of a power supply and generate an interrupt or similar notification each time the POL changes by a specified amount. Similarly, module 40 can monitor PSU temperature and generate an interrupt if the temperature changes by a specified amount. In response to receiving an interrupt indicating a change in POL, module 40 can perform a temperature measurement and efficiency measurement, and thus generate a data point in a multi-dimensional efficiency profile. Similarly, in response to receiving an interrupt indicating a change in operating temperature, module 40 can perform a POL measurement and efficiency measurement to generate a data point in the efficiency profile.

Power management control module 40 is further configured to: 1) determine a total amount of power being supplied to information handling system 100; 2) determine a power utilization and temperature of each PSU; determine an efficiency of each PSU based on the operating parameters and an efficiency profile; and 4) determine a number of PSUs needed to provide the total amount of power so that each PSU is operating at a substantially optimal efficiency based on an amount of power provided by each PSU. The total amount of power to be supplied to information handling system 100 is the total amount of power currently being consumed by all components included at information handling system 100. Because power consumption can fluctuate in response to varying computational activity of servers 20-23, module 40 can collect periodic load measurements in order to calculate an average, steady state, load at each PSU. Module 40 can periodically repeat this process to maintain optimal efficiency as the total power consumed by system 100 changes over time.

Figure 3:
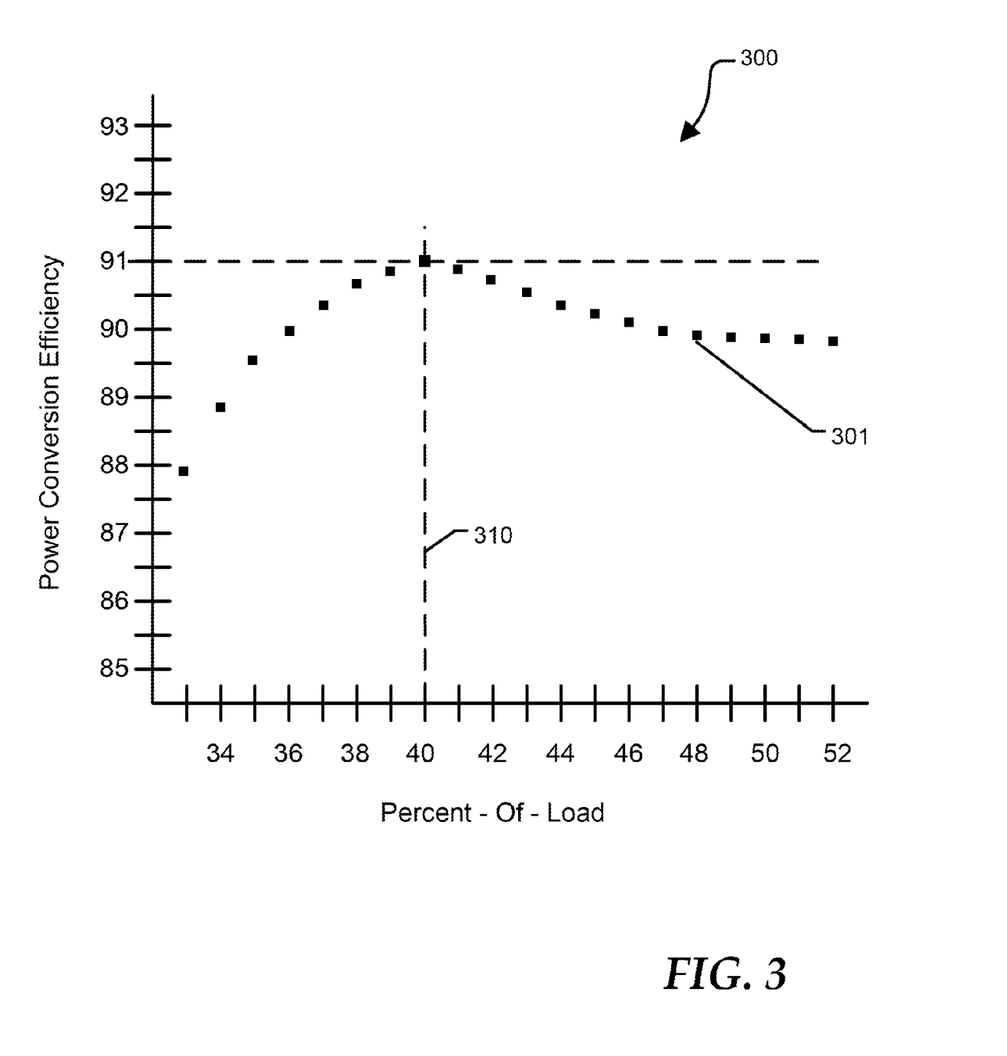
FIG. 3 is a graph illustrating a power conversion efficiency profile associated with a PSU included at the information handling system of FIG. 1 in accordance with a specific embodiment of the present disclosure.

FIG. 3 is a graph 300 illustrating power a conversion efficiency profile of a PSU included at the information handling system of FIG. 1 in accordance with a specific embodiment of the present disclosure. Graph 300 includes a horizontal axis representing percent-of-load, POL, and a vertical axis representing power conversion efficiency, expressed as a percentage. Graph 300 includes a power conversion efficiency profile 301 associated with a representative PSU. A power conversion efficiency profile associates power conversion efficiency in relationship to a range of percent-of-load values. As illustrated by profile 301, the power conversion efficiency of a PSU can vary over a range of operating load, attaining a maximum efficiency of 90% at a POL of 40%, illustrated by reference 310. Conversion efficiency decreases for loads below and above the peak efficiency operating condition. It will be appreciated that a power conversion efficiency profile can include fewer, or a greater number of data points.

Figure 4:
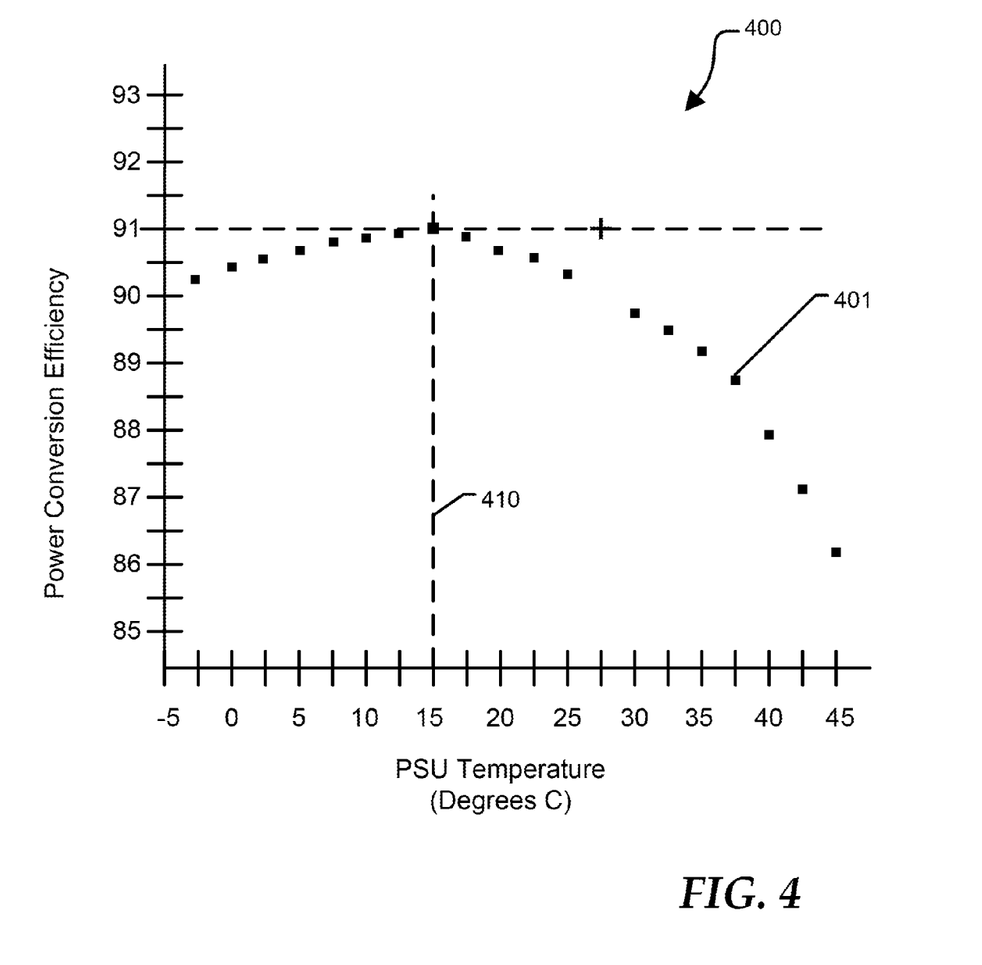
FIG. 4 is a graph illustrating another power conversion efficiency profile associated with a PSU included at the information handling system of FIG. 1 in accordance with another embodiment of the present disclosure.

FIG. 4 is a graph 400 illustrating another power conversion efficiency profile associated with a PSU included at the information handling system of FIG. 1 in accordance with another embodiment of the present disclosure. Graph 400 includes a horizontal axis representing temperature at the PSU, and a vertical axis representing power conversion efficiency, expressed as a percentage. Graph 400 includes a power conversion efficiency profile 401 available at a representative PSU. At FIG. 4, a power conversion efficiency profile associates power conversion efficiency in relationship to an operating temperature of the PSU. As illustrated by profile 401, the power conversion efficiency of a PSU can vary over a range of operating temperature, attaining a maximum efficiency at a temperature of 15° C., illustrated by reference 410.

Efficiency profiles 301 and 401 are merely examples of possible PSU behavior, and the shape of the data curves can vary based on numerous circuit and design characteristics. Power supply efficiency is known to be variable based on many factors, including but not limited to power conversion circuitry, such as transformers, transistors, and other discrete components, inlet temperature, input voltage, switching frequency, and the like. One of skill will appreciate that percentage of load and temperature are two examples of operating conditions of a PSU, and that efficiency profiles can be associated with other operating conditions, such as air flow, humidity, barometric pressure, mains voltage, and the like. Moreover, profiles 301 and 401 are independent. For example, profile 301 does not take temperature into consideration, and profile 401 does not take POL into consideration. As disclosed herein, a PSU can include multi-dimensional efficiency profiles mapping PSU efficiency to two or more simultaneous parameters, such as PSU utilization and operating temperature. Accordingly, module 40 can determine PSU efficiency under a combination of operating conditions.

Figure 5:
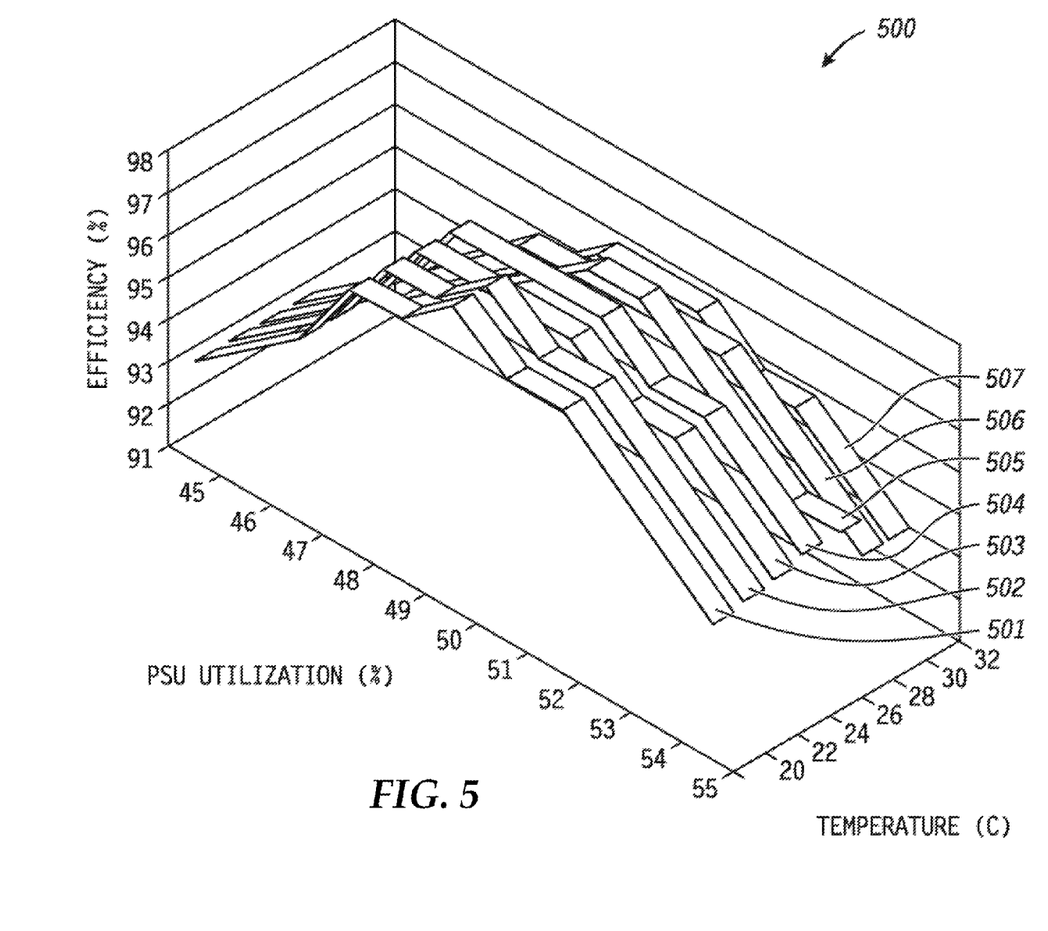
FIG. 5 is a graph illustrating a multi-dimensional power conversion efficiency profile associated with a PSU included at the information handling system of FIG. 1 in accordance with a specific embodiment of the present disclosure.

FIG. 5 is a graph 500 illustrating a multi-dimensional power conversion efficiency profile associated with a PSU included at the information handling system of FIG. 1 in accordance with a specific embodiment of the present disclosure. Graph 500 includes a first horizontal axis representing utilization at a PSU, expressed as a POL, a second horizontal axis representing temperature at the PSU, and a vertical axis representing power conversion efficiency, expressed as a percentage. Graph 500 includes power conversion efficiency profiles 501, 502, 503, 504, 505, 506, and 507, each profile corresponding to a respective sub-range of temperature. Therefore, graph 500 provides PSU efficiency at concurrent values of POL and temperature.

In one embodiment, information characterizing profiles 301, 401, and 501 can be provided by a manufacturer of a PSU and stored at a memory device included at the PSU. The efficiency profile can be accessed by issuing a command provided to the PSU via the PMBus interface. Alternatively, a power conversion efficiency profile can be compiled by power management control module 40 over an extended time of operation of information handling system 100 by issuing commands to the PSU to report input and output power at the PSU. Furthermore, the data included at a power conversion efficiency profile may be updated periodically, e.g. every thousand operating hours, to maintain the accuracy of the data as the efficiency characteristics of the PSU change over time. In an embodiment, a single power conversion efficiency profile can be determined and used to represent one or more of multiple PSUs of identical or similar construction. For example, if information handling system 100 includes six similar PSUs, a single power conversion efficiency profile can be prepared and used to represent each of the six PSUs.

Figure 6:
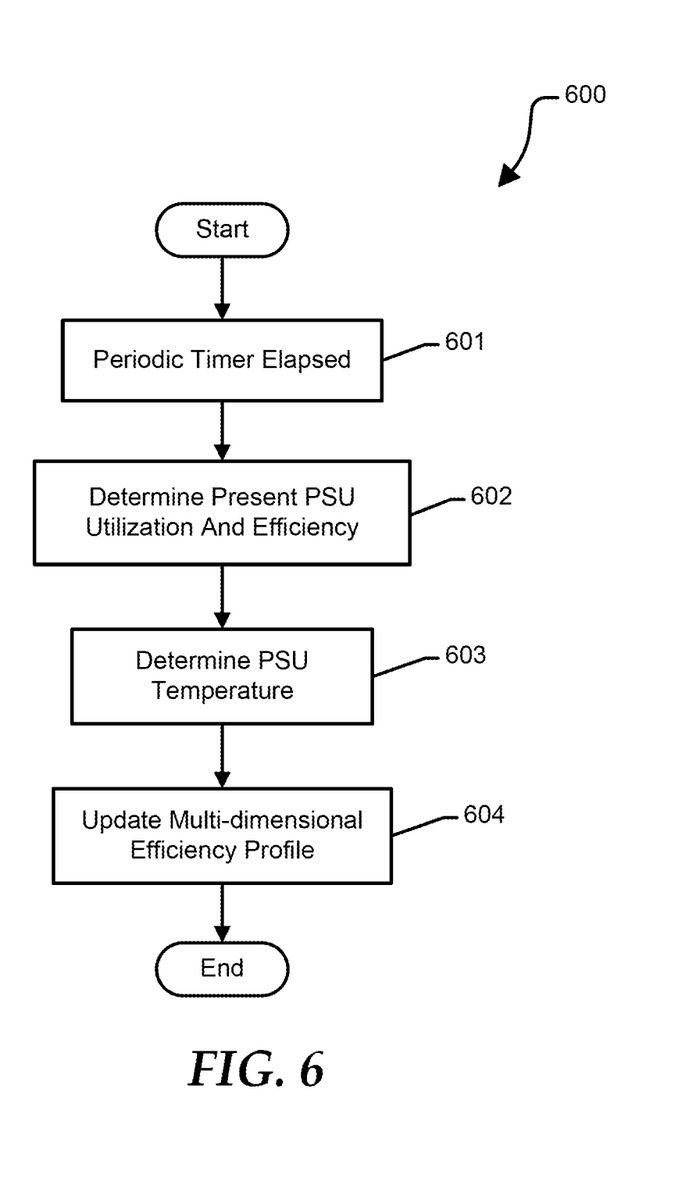
FIG. 6 is a flow diagram illustrating a method for generating data points at the graph of FIG. 5 according to a specific embodiment of the present disclosure.

FIG. 6 is a flow diagram illustrating a method 600 for generating data points at graph 500 of FIG. 5 according to a specific embodiment of the present disclosure. Method 600 starts at block 601 where a timer determines that a predetermined interval of time has elapsed. For example, interrupt/snapshot module 234 of power management control module 40 can periodically generate a signal indicating a snapshot of current operating conditions should be performed. The method continues at block 602 where a present PSU efficiency and present PSU utilization is determined. For example, efficiency computation module can determine a current efficiency and POL of a PSU, as described above. One of skill will appreciate that because current consumption at information handling system 100 can be dynamic, the efficiency and POL measurements can be configured to provide an average value over a predefined interval of time, such as fifty milliseconds.

The method 600 proceeds to block 603 where a temperature of the PSU is determined. For example, module 40 can receive temperature information from environmental sensors or can request PSU temperature information by issuing a corresponding command to the PSU. Because a temperature of a PSU, such as a fan-exhaust temperature, is unlikely to change very quickly, an instantaneous rather than average measurement can be performed. The method continues at block 604 where a multi-dimensional efficiency profile can be updated based on the newly acquired operating data. For example, a data point at graph 500 can be created or updated based on the PSU efficiency corresponding to the substantially simultaneous parameters POL and temperature. Method 500 can be repeated at each PSU included at an information handling system. One of skill will appreciate that another technique can be employed to periodically sample operating parameters, such as an interrupt as described above.

Figure 7:
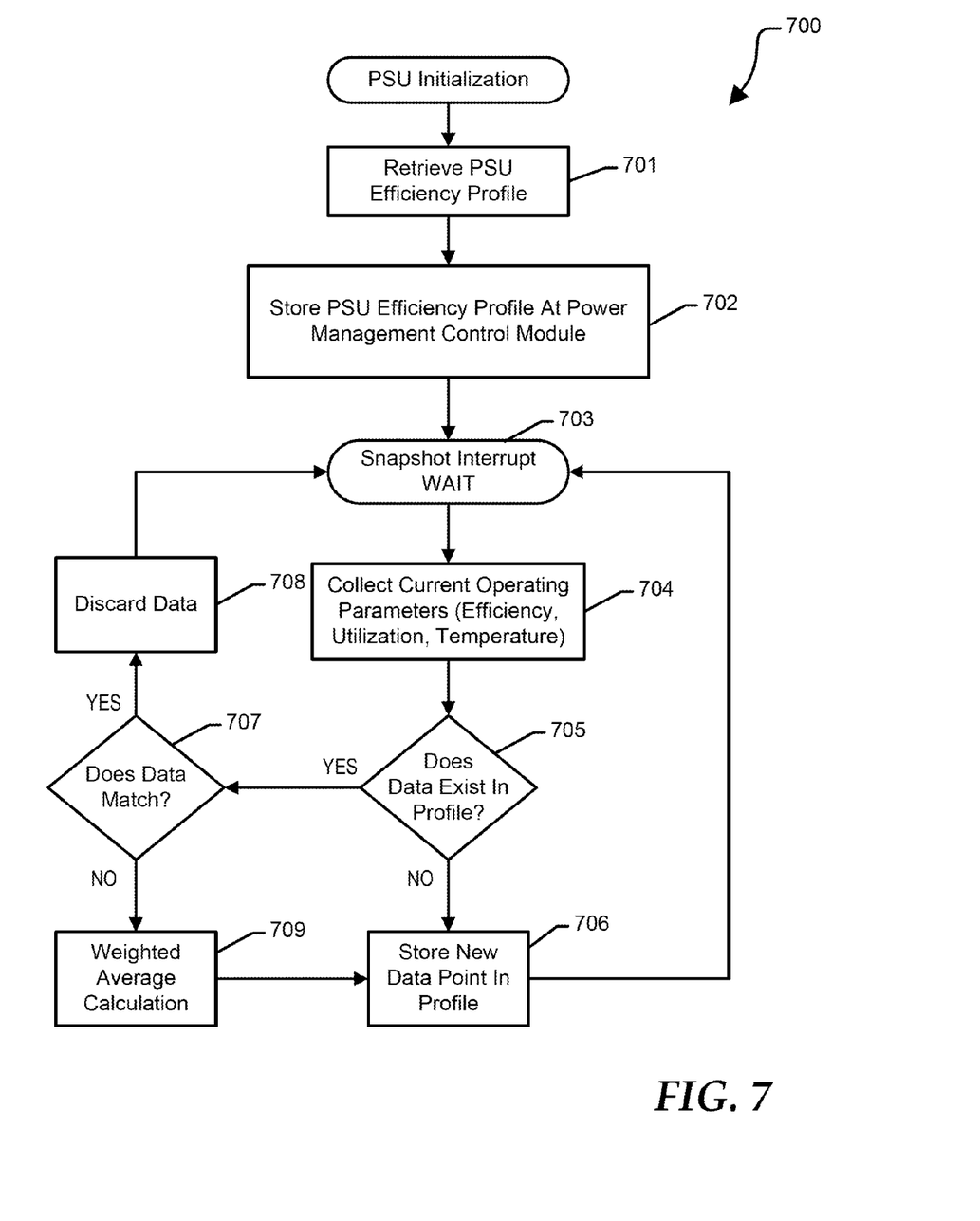
FIG. 7 is a flow diagram illustrating a method for generating data points at the graph of FIG. 5 according to another embodiment of the present disclosure.

FIG. 7 is a flow diagram illustrating a method 700 for generating data points at graph 500 of FIG. 5 according to another embodiment of the present disclosure. Method 700 starts at block 701 where an efficiency profile is retrieved from a PSU. For example, power management control module 40 can issue a command over a PMBus to one or more of PSUs 10-15, requesting the PSU to provide one or more efficiency profiles stored therein. The efficiency profile can be provided by the original equipment manufacturer of the PSU, or it may be an efficiency profile generated by module 40 that was previous stored at the PSU. The profile may include a single-dimensional efficiency profile, such as profiles 301 or 401, or it may be a multi-dimensional profile, such as profile 501. The method proceeds to block 702 where the PSU efficiency profile is stored at a power management control module. The method waits at block 703 until an interrupt is received, or until a predetermined period of time has elapsed.

In response to an interrupt or an elapsed time indicator, the method proceeds to block 704 where current operating parameters are collected. For example, module 40 can issue one or more command to a PSU requesting PSU input power, PSU output power, PSU temperature, and the like. Operating parameters may also be retrieved from sensors located at each PSU or at one or more locations at system 100. The method proceeds to decision block 705 where it is determined if an efficiency profile already includes the collected parameters. For example, a multi-dimensional profile can include PSU POL as a first input parameter and PSU temperature as a second input parameter. If an efficiency profile does not include a data point associating a particular PSU efficiency to the specific combination of input values, the method proceeds to block 706 where a new data point can be added to the efficiency profile. The method now returns to block 703 where the method waits until another interrupt or snapshot even occurs.

Returning to decision block 707, if the efficiency profile does include the specific combination of input parameters, the method proceeds to decision block 707 where it is determined whether the efficiency corresponding to the particular combination of input parameters matches a value previously associated with those parameter values. If the efficiency is the same as previously associated with that combination of input parameters, the method proceeds to block 708 where the newly collected data point information is discarded, and the method returns to block 703 where the method waits until another interrupt or snapshot even occurs. If, at block 707, it is determined that the newly measured PSU efficiency associated with the combination of input parameters is different from that previously associated with that particular combination, the method proceeds to block 709 where an average of the previous efficiency value and the new efficiency value can be calculated. The averaging calculation can be weighted based on a total number and value of samples associated with the pair of input parameters, or based on another algorithm. The method proceeds to block 706 where the new data point can be added to the efficiency profile.

As new data points are collected and added to a multi-dimensional efficiency profile, the updated profile can be stored at data storage device 210 of module 40 and/or at data storage device 242 included at a PSU. One of skill will appreciate that while the previous example illustrates an efficiency profile corresponding to PSU POL and PSU temperature, the multi-dimensional efficiency profile can represent PSU efficiency corresponding to a combination of any operating parameters. For example, the profile can map PSU efficiency to PSU POL and an ambient temperature of information handling system 100. In another embodiment, more than one multi-dimensional efficiency profile can be maintained corresponding to a PSU. For example, one profile can map PSU efficiency to PSU POL and temperature given a particular ambient temperature, while another profile can map PSU efficiency to PSU POL and temperature given another ambient temperature. For another example, a third input parameter may include a value of mains voltage provided the PSUs. For still another example, a PSU may be configured to operate in more than one operating mode, and a unique efficiency profile can be maintained corresponding to each operating mode.

Figure 8:
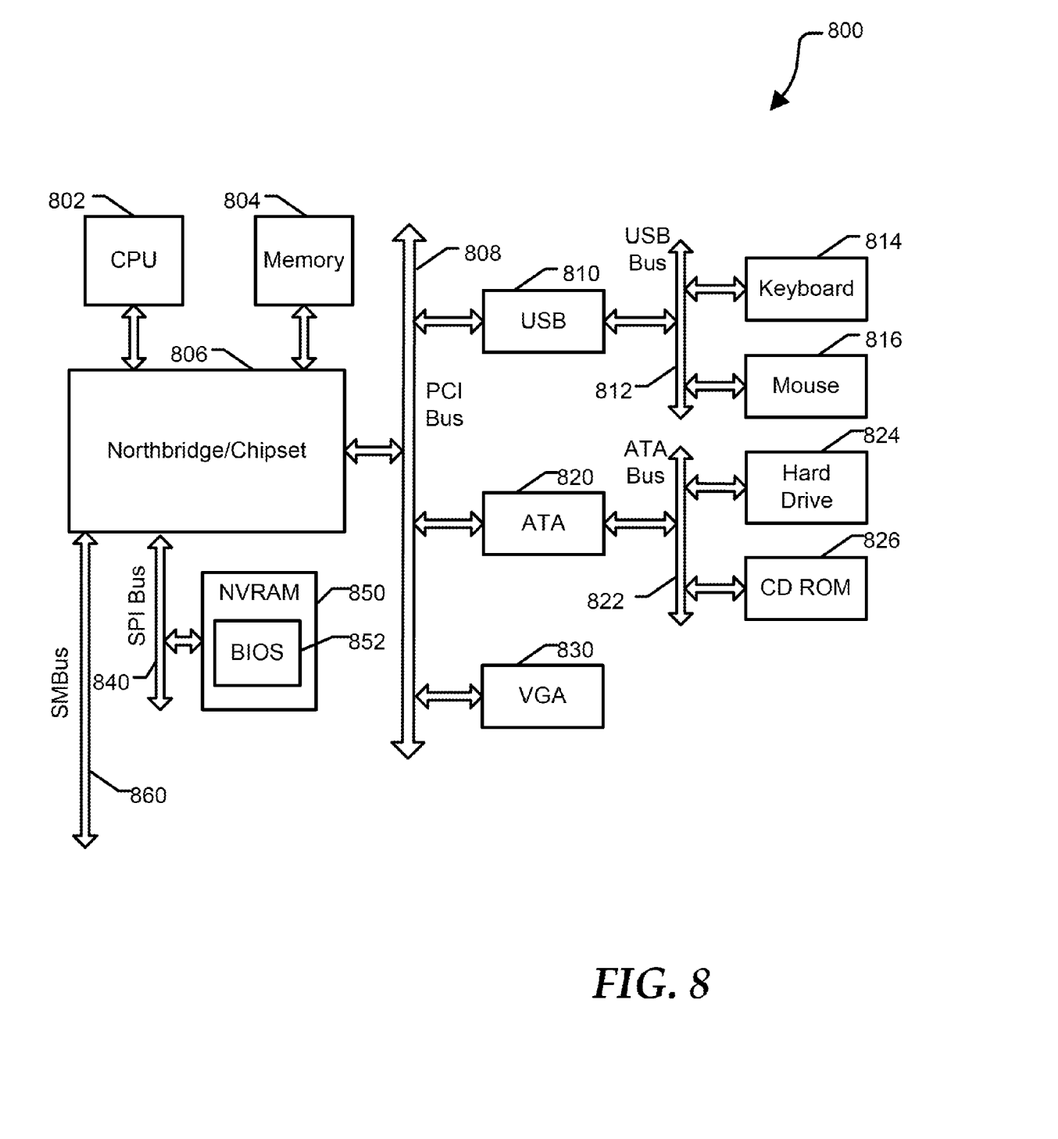
FIG. 8 is a block diagram illustrating an information handling system in accordance with a specific embodiment of the present disclosure.

FIG. 8 illustrates an information handling system 800 including according to a specific embodiment of the present disclosure. For example, system 800 can represent each of server nodes 20-23, CMC 30, or power management control module 40. System 800 includes a processor 802, a memory 804, a northbridge/chipset 806, a PCI bus 808, a universal serial bus (USB) controller 810, a USB 812, a keyboard device controller 814, a mouse device controller 816, an ATA bus controller 820, an ATA bus 822, a hard drive device controller 824, a compact disk read only memory (CD ROM) device controller 826, a video graphics array (VGA) device controller, a serial peripheral interface (SPI) bus 840, and a non-volatile random access memory (NVRAM) 850 for storing a basic input/output system (BIOS) 852. SMBus 860 provides communication between a motherboard, including the above components, and chassis management components, including power supplies, and the like. Information handling system 800 can include additional components and additional busses, not shown for clarity. For example, system 800 can include multiple processor cores, one or more network interface controllers (NICs), and the like. While a particular arrangement of bus technologies and interconnections is illustrated for the purpose of example, one of skill will appreciate that the techniques disclosed herein are applicable to other system architectures. In one embodiment, portions of northbridge/chipset 806 can be integrated within CPU 802.

Information handling system 800 can include one or more storage devices that can store machine-executable code, one or more communications ports for communicating with external devices, and various input and output (I/O) devices, such as a keyboard, a mouse, and a video display. An example of information handling system 800 includes a multi-tenant chassis system where groups of tenants (users) share a common chassis and each of the tenants has a unique set of resources assigned to them. The resources can include blade servers of the chassis, input/output (I/O) modules, Peripheral Component Interconnect-Express (PCIe) cards, storage controllers, and the like.

Information handling system 800 can include a set of instructions that can be executed to cause the information handling system to perform any one or more of the methods or computer based functions disclosed herein. The information handling system 800 may operate as a standalone device or may be connected to other computer systems or peripheral devices, such as by a network.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The information handling system 800 can include a disk drive unit and may include a computer-readable medium, not shown in FIG. 8, in which one or more sets of instructions, such as software, can be embedded. Further, the instructions may embody one or more of the methods or logic as described herein. In a particular embodiment, the instructions may reside completely, or at least partially, within system memory 104 or another memory included at system 800, and/or within the processor 802 during execution by the information handling system 800. The system memory 804 and the processor 802 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

The term "computer-readable medium" can include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    providing a first power supply unit (PSU) and a second PSU, each PSU associated with a corresponding power conversion efficiency profile;
    determining a first operating condition at the first PSU at a first time;
    determining a second operating condition at the first PSU at the first time;
    determining a power conversion efficiency of the first PSU corresponding to the first time;
    generating a three-dimensional power conversion efficiency profile,
        the three-dimensional power conversion efficiency profile electronically associating the power conversion efficiency with the first operating condition and with the second operating condition; and
    engaging an operation of the second PSU based on the three-dimensional power conversion efficiency profile.

2. The method of claim 1, wherein the first operating condition is an amount of power provided by the first PSU.

3. The method of claim 1, wherein the second operating condition is a temperature at the first PSU.

4. The method of claim 1, wherein the first time is determined based on a timer arranged to periodically indicate that a predetermined amount of time has elapsed.

5. The method of claim 1, wherein the first time is determined based on determining that a change in a value of the first operating condition exceeds a first threshold.

6. The method of claim 1, further comprising:
    disengaging the operation of the second PSU based on the three-dimensional power conversion efficiency profile.

7. The method of claim 1, further comprising storing the three-dimensional power conversion efficiency profile at a data storage device at an information handling system.

8. The method of claim 1, further comprising storing the three-dimensional power conversion efficiency profile at a data storage device at the first PSU.

9. The method of claim 1, wherein determining the first operating condition further comprises determining an average value of the first operating condition over a predetermined period of time.

10. A system comprising:
    a data processing device;
    a first power supply unit (PSU) and a second PSU to provide power to the data processing device, the first PSU and the second PSU associated with a corresponding power conversion efficiency profile;
    a power management unit coupled to each of the first PSUs and the second PSU, the power management unit to:
        determine a first operating condition at the first PSU at a first time;
        determine a second operating condition at the first PSU at the first time;
        determine a power conversion efficiency of the first PSU corresponding to the first time;
        generate a three-dimensional power conversion efficiency profile, the three-dimensional power conversion efficiency profile electronically associating the power conversion efficiency with the first operating condition and with the second operating condition; and
        engage operation of the second PSU based on the three-dimensional power conversion efficiency profile.

11. The system of claim 10, wherein the first operating condition is an amount of power provided by the first PSU.

12. The system of claim 10, wherein the second operating condition is a temperature at the first PSU.

13. The system of claim 10, wherein the first time is determined based on a timer arranged to periodically indicate that a predetermined amount of time has elapsed.

14. The system of claim 10, wherein the first time is determined based on determining that a change in a value of the first operating condition exceeds a first threshold.

15. The system of claim 10,
wherein the power management unit is further to disengage operation of the second PSU based on the three-dimensional power conversion efficiency profile.

16. The system of claim 10, wherein the power management unit is further to store the three-dimensional power conversion efficiency profile at a data storage device at a data storage device at the first PSU.

17. A non-transitory computer-readable medium storing a software program, the software program comprising a set of instructions to manipulate at least one processor to:
determine a first operating condition at a first power supply unit (PSU) at a first time;
determine a second operating condition at the first PSU at the first time;
determine a power conversion efficiency of the first PSU corresponding to the first time;
generate a three-dimensional power conversion efficiency profile corresponding to the first PSU, the three-dimensional power conversion efficiency profile electronically associating the power conversion efficiency with the first operating condition and the second operating condition; and
engage an operation of the second PSU based on the three-dimensional power conversion efficiency profile.

18. The computer-readable medium of claim 17, wherein the first operating condition is an amount of power provided by the first PSU.

19. The computer-readable medium of claim 17, wherein the second operating condition is a temperature at the first PSU.

20. The computer-readable medium of claim 17, wherein the first time is determined based on a timer arranged to periodically indicate that a predetermined amount of time has elapsed or based on determining that a change in a value of the first operating condition exceeds a first threshold.

* * * * *